Figure 1:
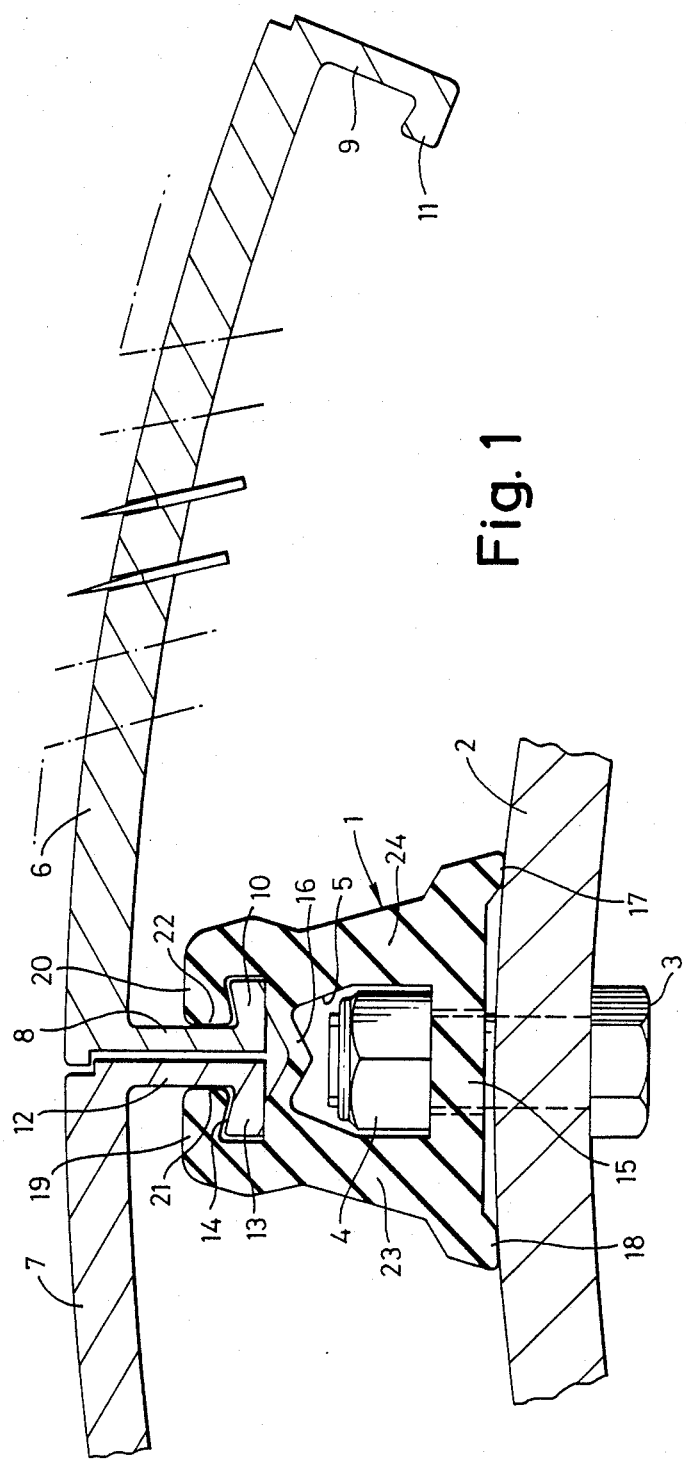

United States Patent [19]

Stewart et al.

[11] Patent Number: 4,825,511
[45] Date of Patent: May 2, 1989

[54] SECURING SEGMENTS TO A BASE

[75] Inventors: David B. Stewart, Newtyle; John M. C. Dickinson, Largowald, by Elie; Brian D. Hogan, Rait, all of Scotland

[73] Assignee: Wm. R. Stewart & Sons (Hacklemakers) Limited, Dundee, Scotland

[21] Appl. No.: 119,120

[22] Filed: Nov. 10, 1987

[30] Foreign Application Priority Data

Nov. 12, 1986 [GB] United Kingdom ................. 8626965

[51] Int. Cl.⁴ .............................................. D01G 9/04
[52] U.S. Cl. .......................................... 19/85; 19/94; 19/97
[58] Field of Search ................................ 19/85, 94, 97

[56] References Cited

U.S. PATENT DOCUMENTS

| 3,123,866 | 3/1964 | Stewart et al. | 19/97 |
| 4,270,245 | 6/1981 | Stewart et al. | 19/85 |

FOREIGN PATENT DOCUMENTS

| 0258828 | 8/1912 | Fed. Rep. of Germany | 19/97 |
| 0004764 | of 1823 | United Kingdom | 19/97 |
| 0004737 | of 1879 | United Kingdom | 19/97 |
| 0739311 | 10/1955 | United Kingdom | . |
| 0862026 | 3/1961 | United Kingdom | . |

Primary Examiner—Louis K. Rimrodt
Attorney, Agent, or Firm—Cushman, Darby & Cushman

[57] ABSTRACT

A method of securing a plurality replaceable segments to a base wherein a plurality of deformable supporting members are releasably fastened to the base and wherein co-operating means are provided on a rear face of the segments and on the supporting members, the arrangement being such that the means connecting the supporting members to the base are also used to cause the means on the supporting members to engage with the co-operating means on the rear of the segments.

While it is envisaged the invention could be used for securing any working surface to a base member, the invention is particularly suited to securing replaceable segments on a rotary work member and also has particular utility in the textile field for connecting staves to a bas roller or the like.

14 Claims, 2 Drawing Sheets

SECURING SEGMENTS TO A BASE

This invention relates to an improved method and means of securing segments to a base.

It is particularly relevant to the textile industry for securing carding staves, rag-tearing staves or foundation staves to a roller or to bearers but it will be appreciated that this means of securing a segment to a base can have many other applications in many other industrial and technical environments, where the segments need to be changed, for example, when they wear out.

In the textile industry, use is frequently made of rollers covered with points or spikes of various sizes and with various point-densities for many processes, but in particular for carding fibres and for rag-tearing.

For finer pinnings, card wire or flexible clothing wound onto a base roller is commonly used whilst pinned staves (other wise known as lags), made from beech-wood, laminated resin impregnated wood or aluminum and its alloys are well known for heavier applications such as the carding of bast fibres and also for rag-tearing.

Such staves are secured, usually to a supporting base roller but sometimes directly to simple bearer flanges fitted to a shaft, by a variety of known means. These include machine screws, through bolts co-operating with nuts, T-shaped clamps, hoops, etc.

All these means of securing the staves have some drawbacks. In particular, they all require some part of the working surface of the pinned stave to be free of pins to allow space for the securing means to be accommodated. This reduces the effectiveness of the machine and in some cases leads to a variation in the number of pins working on the textile material across the width of the roller.

Even in the case of rollers to be covered with card wire or flexible clothing the manufacture of the supporting base roller is itself an expensive proposition.

The present invention seeks to provide an improved means of securing segments to a base, and especially staves to a supporting base roller or flanges while at the same time allowing a full coverage of the face of the stave with pins if necessary.

Surprisingly it has also been found that the same system can be used to manufacture a base-roller for subsequent covering with card wire or flexible card clothing, and for that matter, can be used to attach replaceable segments to other base members used for many different purposes.

Aluminium staves with interlocking features are known at least from U.K. Patent Specification No. 739311 and aluminium staves with feet are also known from U.K. Patent Specification No. 862026.

Both these specifications presuppose that the staves are secured at least in part by means of screws through the face of each stave.

According to the broadest aspect of the present invention, we provide a method of securing a plurality of replaceable segments to a base wherein a plurality of elastically deformable supporting members are releasably fastened to the base, and wherein co-operating means are provided on a rear face of the segments and on the supporting members whereby the means on the supporting members may be deformed and brought into clamping engagement with the means on the segments.

Also according to the present invention, we provide apparatus comprising at least one base member to which a plurality of elastically deformable support members are releasably fastened, and a plurality of replaceable segments removably mounted on the support members, and including deformable means on the support members clampingly engaging co-operating means on a rear face of the segments.

In a preferred arrangement of the present invention, we provide a textile carding device comprising a base member having an appropriate number of longitudinally extending elastically deformable supporting members which are releasably fastened internally by tension means to the base member and a plurality of staves or segments releasably mounted on the supporting members to provide a working surface, and wherein co-operating means are provided on the supporting members and on the rear of the staves or segments to clamp the staves or segments to the supporting members.

The co-operating means can take several forms but preferably take the form of hook-shaped feet or of longitudinally extending corrugations or grooves on the segments or staves.

It is preferred that the base member is a roller or at least one bearer mounted on a rotatable shaft.

The deformable supporting members are preferably manufactured from a suitable grade of aluminium alloy by extrusion and may be of tubular or of a modified channel section. They are preferably formed in a modified "A" or "H" shape with pedals to rest on the base, e.g. a supporting roller, and hooks and support ledges at the top of the uprights of the "A" or "H" co-operate with the hook-shaped feet on the segments or staves.

Preferably, the supporting members are connected to the base by one or more fasteners extending through a bottom crossbar of the "A" or "H" and in use the hooks and support ledges of each supporting member are caused to close up towards each other to grip a pair of hooked feet on two adjacent staves. This closing up may be effected by external mechanical means but it is preferable to rely solely on the elastic deformation of the supporting member when it is secured to the base member by means of the fasteners, e.g. bolts, passing through apertures in the bar of the "A" or "H".

Alternatively or additionally the clamping faces of the hooks and the co-operating means on the segments or stave-legs may be roughened or provided with corrugations or grooves to increase the grip of the supporting member on the staves.

In addition, appropriate shaping of the co-operating surfaces of the hooks and hooked feet can be utilised to generate a radially inward clamping force on the stave-legs.

It has been found that the method of construction disclosed herein can ideally be used to manufacture base rollers comprising a shaft and bearers for subsequent wrapping with card wire or flexible card clothing.

Figure 2:
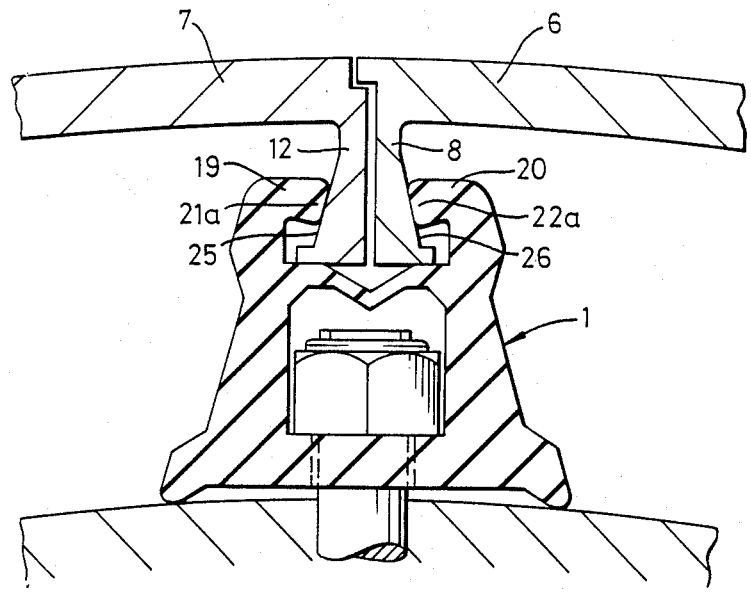
Figure 3:
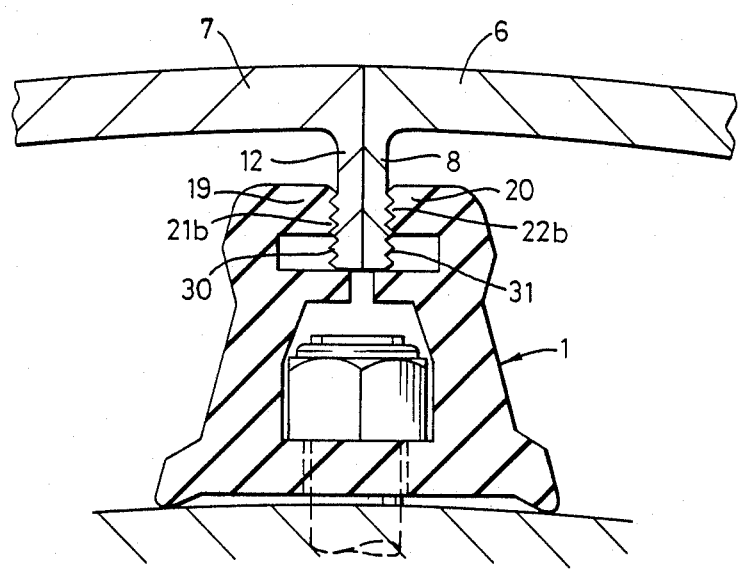

Three embodiments of the invention are now described by way of example with reference to the accompanying drawings, in which:

FIG. 1 is a section through one embodiment of profiled tube co-operating with staves with longitudinal hook-shaped feet where the clamping force generated is purely circumferential;

FIG. 2 is a section through another embodiment of profiled tube co-operating with staves with longitudinal hook-shaped feet having one example of suitable angled co-operating faces, and FIG. 3 is a section through another embodiment of profiled tube co-operating with staves with the longitudinal clamping faces of the hooks and co-operating surfaces of the stave-legs being provided with corrugations or grooves to increase the grip on the staves.

Referring to FIG. 1 of the drawings, there is shown an extruded supporting member 1 secured to a base roller 2 (shown in part only) by means of a bolt 3 co-operating with a nut 4. In this embodiment the nut 4 is held captive within a channel 5 which extends lengthwise of the supporting member 1.

The nut 4 can additionally be secured by means of a dowel or a clamping screw (not shown).

Two adjacent staves 6 and 7 are shown. These staves are shown unpinned but could also be pinned either radially or at a conventional angle.

The stave 6 has legs 8 and 9 with hooked feet 10 and 11. The adjacent stave 7 (shown in part only) has a corresponding pair of legs of which one leg 12 and hooked foot 13 is shown. The hooked feet each have an upper surface 14 which forms a reversed wedge.

The supporting member 1 as shown has the form of a modified double-barred letter "H" with the top legs of the "H" formed as reversed wedge hooked clamps 19 and 20 which co-operate with the hooked feet 10 and 13 of the staves 6 and 7 to hold the staves 6 and 7 in a radial direction.

The supporting member 1 also has a lower bar section 15 and an upper bar section 16 defining an internal channel 5. The upper bar section 16 is of "V" shape and is sufficiently thin to be easily deformable in an inward direction.

Upright sections 23 and 24 connect the bar sections 15 and 16 and these are so dimensioned as to be significantly stiffer than the lower bar section 15. The bolts 3 holding the member 1 to the roller 2 pass through apertures in this section 15. The supporting member also has pedals 17 and 18 on which the member 1 sits on the base roller 2 so that the lower surface of the lower bar section 15 is held clear of the surface of the base roller 2.

When the nut 4 on the bolt securing the supporting member 1 to the base roller 2 is tightened, the lower bar section 15 is bowed elastically between the pedals 17 and 18 causing the upright sections 23 and 24 to move toward each other, distorting the upper "V" shaped bar section 16, and in turn clamping the legs 8 and 12 of the staves 6 and 7 together between clamping faces 21 and 22 of the hooked clamps 19 and 20.

Referring now to FIGS. 2 and 3, there are shown supporting members 1 and staves 6 and 7 which are modified in the region of the hooks and hooked feet.

In the modification shown in FIG. 2, the clamping faces 21a and 22a of the hooked clamps 19 and 20 are formed at an angle such that when they co-operate with corresponding angled faces 25 and 26 on the legs 12 and 8 of the staves, a radially inwards force (towards the centre of the roller) is generated.

In the modification shown in FIG. 3, the clamping faces 21b and 22b of the hooked clamps 19 and 20 are formed with longitudinal grooves or corrugations such that when they co-operate with corresponding grooves or corrugations 30,31, on the legs 12 and 8, the clamping force together with the grooves or corrugations preclude a radially outwards movement of the staves 6 and 7.

The present invention has been described above as applied to the securing of staves to a base roller, but it will be appreciated that there are many other uses to which the invention can be put. Also, there are many other variations and possible constructions which can achieve similar effects. For example, it could be used to secure segments to a flanged bearer mounted on a shaft. It is even envisaged that the invention could be used to secure any replaceable working surfaces onto a base member, although the invention has been particularly designed for use in the textile trade, and especially for rotatable textile carding machinery.

Furthermore, it is also possible to cause the requisite clamping movement onto the legs of the segments or staves by direct means.

In place of the nut, a suitable thread may be cut into the lower bar section or into a metal insert therein.

Under certain circumstances, it may be preferable to cut away part of the upper bar section, as shown in FIG. 3, or to dispense with it entirely.

It may also be necessary in certain circumstances to insert axial stiffening members under the nut to extend the distance over which the clamping and bending force of the nut and bolt is exerted.

It will of course be understood that the present invention has been described above purely by way of example, and modifications of detail can be made within the scope of the invention.

We claim:

1. A method of securing a plurality of replaceable segments to a base member wherein a plurality of elastically deformable supporting members separate from the segments are releasably fastened to the base member, and wherein co-operating means are provided on a rear face of the segments and on the supporting members whereby the means on the supporting members may be deformed and brought into clamping engagement with the means on the segments, co-operating means providing the only means of securing the segments to the base member so as to leave the face of the segments free of securing means.

2. Apparatus comprising at least one base member to which a plurality of elastically deformable supporting members are releasably fastened, and a plurality of replaceable segments removable mounted on the supporting members, said segments being separate from the supporting members, and including deformable means on the supporting members clampingly engaging co-operating means on a rear face of the segments, said co-operating means providing the only means of securing the segments to the base member so as to leave the face of the segments free of securing means.

3. Apparatus as claimed in claim 1 or 2 wherein said segments provide a flat work surface.

4. Apparatus as claimed in claim 1 or 2 wherein said segments provide a cylindrical working surface.

5. Apparatus as claimed in claim 2 wherein said co-operating means comprise hook-shaped feet.

6. Apparatus according to claim 2 wherein said co-operating means comprise longitudinally extending corrugations or grooves.

7. A textile carding device comprising a base member having a plurality of longitudinally extending elastically deformable supporting members which are releasably fastened internally by tension means to the base member and a plurality of staves or segments releasably mounted on the supporting members to provide card clothing, and wherein co-operating means are provided on the supporting members and on the rear of the staves or segments to clamp the staves or segments to the supporting members, said co-operating means providing the only means of securing the segments to the base member so as to leave the face of the segments free of securing means.

8. A textile carding device according to claim 7, wherein the card clothing is provided by locating card wire or flexible clothing on the staves or segments.

9. A textile carding device according to claim 7, wherein the card clothing is provided by securing pins in apertures in the staves or segments.

10. Apparatus as claimed in claim 5, wherein said base member is a roller.

11. Apparatus as claimed in claim 5, wherein said base member is at least one bearer mounted on a rotatable shaft.

12. Apparatus as claimed in claim 5 wherein said deformable supporting members are manufactured from a suitable grade of aluminium alloy by extrusion and are of tubular or of a modified channel section.

13. Apparatus as claimed in claim 12 wherein the supporting members are formed in a modified "A" or "H" shape with pedals to rest upon the base member and hooks and support ledges at the top of the uprights of the "A" or "H" co-operate with said co-operating means.

14. Apparatus as claimed in claim 13 wherein the supporting members are connected to the base member by one or more fasteners extending through a bottom crossbar of the "A" or "H" and in use the hooks and support ledges of each supporting member are caused to close up towards each other to grip the co-operating means on a pair of adjacent replaceable segments or staves.

* * * * *